US010018743B2

(12) United States Patent
Josse et al.

(10) Patent No.: US 10,018,743 B2
(45) Date of Patent: Jul. 10, 2018

(54) DEEP TOWED SEISMIC SOURCE STRING

(71) Applicant: CGG SERVICES SA, Massy (FR)

(72) Inventors: Florian Josse, Lorient (FR); Herve Richer De Forges, Massy (FR); Junya Konno, Massy (FR)

(73) Assignee: CGG SERVICES SAS, Massy (FR)

( * ) Notice: Subject to any disclaimer, the term of this patent is extended or adjusted under 35 U.S.C. 154(b) by 243 days.

(21) Appl. No.: 14/969,247

(22) Filed: Dec. 15, 2015

(65) Prior Publication Data

US 2016/0223696 A1    Aug. 4, 2016

(51) Int. Cl.
*G01V 1/38* (2006.01)
(52) U.S. Cl.
CPC .......... *G01V 1/3861* (2013.01); *G01V 1/3808* (2013.01); *G01V 1/3826* (2013.01); *G01V 2210/127* (2013.01)
(58) Field of Classification Search
CPC .. G01V 1/3808; G01V 1/3861; G01V 1/3826; G01V 2210/127
USPC .......................................................... 367/17
See application file for complete search history.

(56) References Cited

U.S. PATENT DOCUMENTS

| 3,744,020 | A  | 7/1973  | Kirby            |
| 6,606,958 | B1 | 8/2003  | Bouyoucos        |
| 8,593,905 | B2 | 11/2013 | Gagliardi et al. |
| 2014/0010044 | A1 | 1/2014 | Hovland et al. |

FOREIGN PATENT DOCUMENTS

WO    WO 2012041844 A1 *    4/2012    ............... G01V 1/02

* cited by examiner

*Primary Examiner* — Daniel L Murphy
(74) *Attorney, Agent, or Firm* — Patent Portfolio Builders PLLC

(57) ABSTRACT

Seismic source modules are combined into seismic source strings that are grouped into seismic source arrays. The seismic source array includes a plurality of seismic source strings arranged in parallel and towed behind a seismic source vessel. Each seismic source string includes a plurality of seismic source modules coupled in series along the seismic source string. Each seismic source module includes a protective cage, at least one seismic source disposed within the protective cage and decoupled from the protective cage and a pair of couplers in communication with the protective cage. The seismic source string also includes a plurality of tethers attached to couplers between adjacent pairs of seismic source modules in the series of seismic source modules.

19 Claims, 6 Drawing Sheets

DEEP TOWED SEISMIC SOURCE STRING

CROSS REFERENCE TO RELATED APPLICATIONS

This application claims priority and benefit from U.S. Provisional Patent Application No. 62/110,771, filed Feb. 2, 2015, for "Deep Towed Seismic Source Arrangement", the entire contents of which is incorporated herein by reference.

TECHNICAL FIELD

Embodiments of the subject matter disclosed herein generally relate to towed seismic sources.

BACKGROUND

In marine based seismic acquisition systems, one or more vessels tow seismic sources including vibrational sources and impulse sources. Each vessel can pull a single source or an array of sources. These source arrays can include one or more strings. Each string includes one or more seismic sources and is connected to the towing vessel using an umbilical and a head module. Spacing among the strings in the source array and the overall spread of the source array are maintained using, for example, an arrangement of spreaders, active steering mechanisms such as "birds" and cables or ropes. The desired depth of each string and in particular the seismic sources along each string are maintained using one or more flotation devices spaced along the length of each string from the head module through the seismic sources.

Conventional towed seismic source arrays locate the seismic sources from the surface of the water down to a maximum depth of about 12 meters. However, certain applications and operational conditions of the marine based seismic source require sources to be towed at a depth greater than about 12 meters. However, the conventional arrangement of source arrays does not facilitate these deeper seismic source deployments. Therefore, seismic source modules and arrays of seismic source modules are desired that can be towed in a marine environment at depths exceeding 12 meters.

SUMMARY

Embodiments are directed to seismic source modules that can be combined into seismic source strings that are grouped into seismic source arrays. The seismic source array includes a plurality of seismic source strings arranged in parallel and towed behind a seismic source vessel. Each seismic source string includes a plurality of seismic source modules coupled in series along the seismic source string. Each seismic source module includes a protective cage, at least one seismic source disposed within the protective cage and decoupled from the protective cage and a pair of couplers in communication with the protective cage. Each seismic source module includes a steering system in communication with the protective cage that is configured to move the seismic source module in three dimensions. In one embodiment, each seismic source module includes two separate seismic sources disposed in and decoupled from the protective cage. The seismic source string also includes a plurality of tethers. Each tether is attached to couplers between adjacent pairs of seismic source modules in the series of seismic source modules. These couplers include an attachment mechanism and at least one of a rotational dampening mechanism and a tensional dampening mechanism disposed between the attachment mechanism and the protective cage. The tethers are attached to these attachment mechanisms between adjacent pairs of seismic source modules.

An exemplary embodiment is directed to a deep towed seismic source string having an umbilical for attachment to a towing vessel, a head module attached to the umbilical, a plurality of seismic source modules coupled in series and attached to the head module and a single surface buoy attached to the head module. The plurality of seismic sources has neutral buoyancy. In one embodiment, each individual seismic source module in the plurality of seismic source modules has neutral buoyancy. In one embodiment, the plurality of seismic source modules includes four seismic source modules. In one embodiment, a cable is attached to the surface buoy and head module. This cable has a length sufficient to establish a depth of at least 20 meters for the plurality of seismic source modules. In one embodiment, a depressor mechanism is attached to the head module to provide downward force on the head module. In addition, a vertical steering wing is attached to the umbilical.

In one embodiment, each individual seismic source module contains a protective cage, and at least one seismic source disposed within the protective cage and decoupled from the protective cage. Each seismic source module can also include at least one mechanical isolation mount disposed between the at least one seismic source and the protective cage to decouple the at least one seismic source from the protective cage. In one embodiment, each seismic source module includes a steering system in communication with the protective cage. The steering mechanism is configured to move the seismic source module in three dimensions. This steering system has at least one fin extending outward from the protective cage, and the at least one fin can be an active foil. In one embodiment, the steering system includes a plurality of fins extending outward from the protective cage along at least two perpendicular axes. In one embodiment, the steering system includes a buoyancy system disposed within the protective cage. The buoyancy system is configured to establish positive buoyancy, negative buoyancy or neutral buoyancy in the seismic source module.

In one embodiment, each seismic source module includes at least one coupler in communication with the protective cage. This coupler has an attachment mechanism and at least one of a rotational dampening mechanism and a tensional dampening mechanism disposed between the attachment mechanism and the protective cage. The deep towed seismic source string can include a plurality of tethers. Each tether is attached to attachment mechanisms on couplers between adjacent pairs of seismic source modules in the series of seismic source modules. In one embodiment, each seismic source module includes at least one of seismic sensors and control electronics disposed within the protective cage and decoupled from the protective cage and the at least one seismic source.

An embodiment is directed to a deep towed seismic source array using a plurality of deep towed seismic source strings arranged in parallel. Each deep towed seismic source string includes an umbilical for attachment to a towing vessel, a head module attached to the umbilical, a plurality of seismic source modules coupled in series and attached to the head module and a single surface buoy attached to the head module. The plurality of seismic sources has neutral buoyancy. In one embodiment, each seismic source module includes a protective cage, at least one seismic source disposed within the protective cage and decoupled from the protective cage and a pair of couplers in communication with the protective cage. Each coupler includes an attachment mechanism and at least one of a rotational dampening mechanism and a tensional dampening mechanism disposed between the attachment mechanism and the protective cage. Also included is a plurality of tethers. Each tether is attached to attachment mechanisms on couplers between adjacent pairs of seismic source modules in the series of seismic source modules. A steering system is included in communication with the protective cage and is configured to move the seismic source module in three dimensions. The steering mechanism includes a buoyancy system disposed within the protective cage. The he buoyancy system is configured to establish positive buoyancy, negative buoyancy or neutral buoyancy in the seismic source module.

An embodiment is directed to a deep towed seismic source string having at least one deep towed seismic source module with a protective cage, at least one seismic source disposed within the protective cage and decoupled from the protective cage and at least one mechanical isolation mount disposed between the at least one seismic source and the protective cage to decouple the at least one seismic source from the protective cage. In one embodiment, the seismic source module includes a steering system in communication with the protective cage and configured to move the seismic source module in three dimensions. This steering system includes a plurality of fins extending outward from the protective cage along at least two perpendicular axes and a buoyancy system disposed within the protective cage. The buoyancy system is configured to establish positive buoyancy, negative buoyancy or neutral buoyancy in the seismic source module.

An embodiment is directed to a method for deep towing a seismic source string. A plurality of seismic source modules is coupled in series. The plurality of seismic sources has a neutral buoyancy. A head module is attached to the plurality of seismic sources and an umbilical. In addition, a single surface buoy is attached to the head module. A towing vessel attached to the umbilical is used to tow the plurality of seismic source modules at a depth of at least 20 meters. In one embodiment, a buoyancy system disposed within each seismic source module is used to establish positive buoyancy, negative buoyancy or neutral buoyancy in each seismic source module.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the embodiments refers to the accompanying drawings. The same reference numbers in different drawings identify the same or similar elements. The following detailed description does not limit the invention. Instead, the scope of the invention is defined by the appended claims. Some of the following embodiments are discussed, for simplicity, with regard to local activity taking place within the area of a seismic survey. However, the embodiments to be discussed next are not limited to this configuration, but may be extended to other arrangements that include regional activity, conventional seismic surveys, etc.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
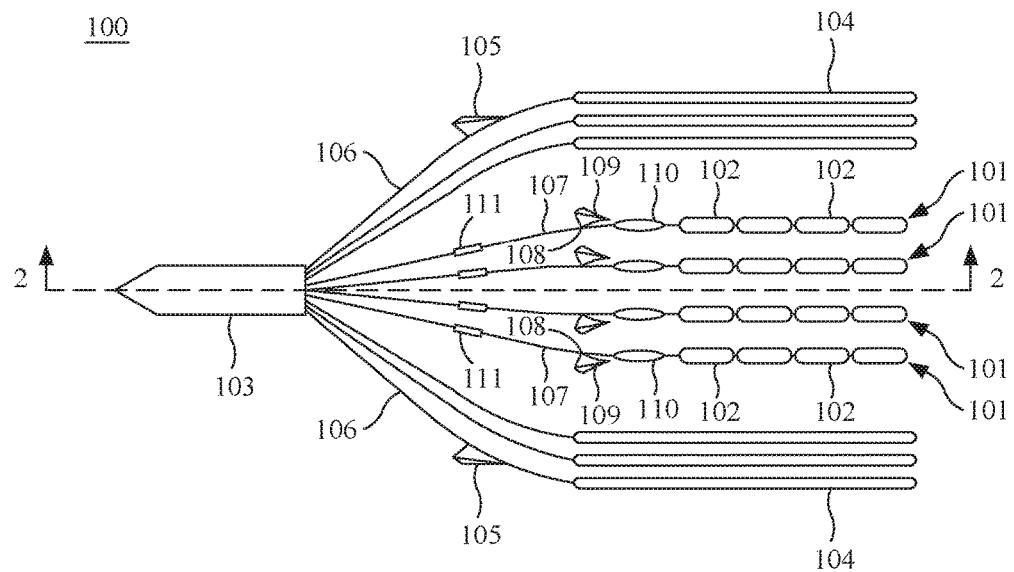
FIG. 1 is a schematic representation of an embodiment of a deep towed seismic source array.

Embodiments are directed to deep towed seismic source modules configured to be towed below the surface of the water at depths of 12 meters or more. Referring initially to FIG. 1, an embodiment is directed to a seismic source array 100 containing a plurality of seismic source strings 101 arranged in parallel. Each seismic string includes at least one and preferably a plurality of individual seismic source modules coupled in series along the seismic source string. In one embodiment, each string includes four seismic source modules. These seismic source modules are configured to be deployed at depths below about 20 meters. The plurality of seismic source modules has a neutral buoyancy. In one embodiment, each individual seismic source module has a neutral buoyancy.

Each seismic source string also includes a single surface buoy 110. Suitable surface buoys are known and available in the art. The surface buoy is attached at a head module 108 of the seismic source string. Also attached at the head module is a depressor mechanism 109. Suitable depressors mechanism include, but are not limited to a horizontal depressor wing and a weight. The depressor mechanism provides a down force on the head module and seismic source string and works in combination with the single surface buoy to establish and maintain a desired depth in the seismic source string.

Each seismic source string in the seismic source array is attached to and pulled by a towing vessel 103 through a lead-in or umbilical 107 attached to the head module of the seismic source string. The towing vessel can also tow a plurality of additional surface or shallow seismic source strings 104. These additional seismic sources can be towed by cables 106 that include spreaders 105 to establish the desired spread in the additional seismic source strings. Suitable shallow source strings, cables, lead-ins and spreaders are known and available in the art. In addition, cables and ropes known and available in the art can be used between strings to establish and maintain the desired spacing among the individual strings.

Figure 2:
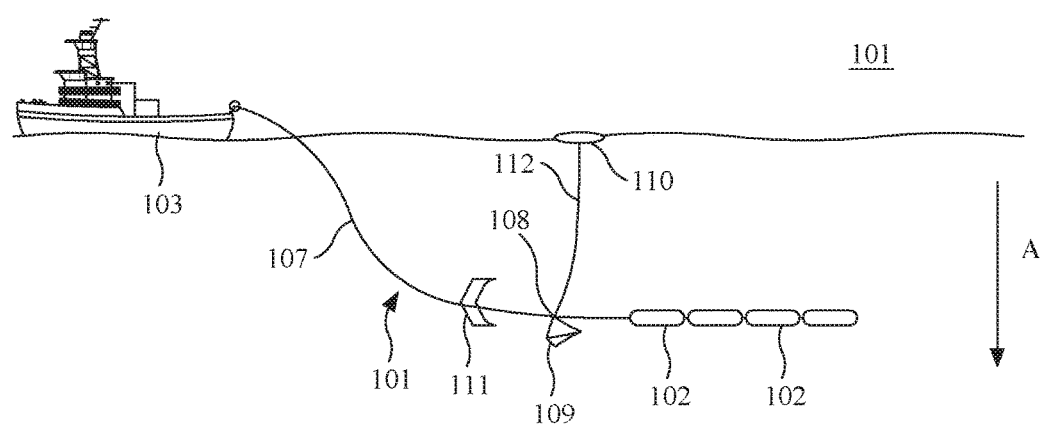
FIG. 2 is a schematic representation of an embodiment of a deep towed seismic source string.

FIG. 2 provides a view of one of the seismic strings 101 when viewed, for example, through line 2-2 of FIG. 1.

Suitable seismic source modules 102 include any embodiment of a seismic source module as described herein. In general, these seismic source modules include a protective cage, at least one seismic source disposed within the protective cage and decoupled from the protective cage and a pair of couplers in communication with the protective cage. In addition, each seismic source string in the seismic source array includes a plurality of tethers. Each tether is attached to couplers between adjacent pairs of seismic source modules in the series of seismic source modules. In one embodiment, each coupler comprises includes an attachment mechanism and at least one of a rotational dampening mechanism and a tensional dampening mechanism disposed between the attachment mechanism and the protective cage. Each tether is attached to attachment mechanisms between adjacent pairs of seismic source modules. Each seismic source module includes a steering system in communication with the protective cage and configured to move the seismic source module in three dimensions and two separate seismic sources disposed in and decoupled from the protective cage.

Each seismic source string in the seismic source array includes the head module 108 attached to the first one of the plurality of seismic source modules 102 arranged in series. The umbilical 107 is attached to the head module opposite the seismic modules and extends to the towing vessel 103. The umbilical provides physical attachment as well as electrical power and electronic communications between the components of the seismic source string and the towing vessel. The depressor mechanism 109 is attached to the head module and provides downward force on the head module and seismic source string as indicated by arrow A. The single surface buoy 110 is also attached to the head module through a cable 112. The single surface buoy provides a buoyant force opposite of the downward force created by the depressor mechanism. Therefore, the depressor mechanism and single surface buoy work together to establish the desired depth for the head module. This depth is further defied the cable, which has a length sufficient to establish the desired depth. In one embodiment, this desired depth is at least about 20 meters. As the plurality of seismic source modules have a neutral buoyancy, either individually or collectively, this also establishes and maintains the desired depth in the plurality of seismic source modules.

Each seismic source string also includes an umbilical steering system 111 disposed along the length of the umbilical. Suitable steering systems include a vertical steering wing that provides or maintains lateral separation among the seismic source strings in the seismic source array. In one embodiment, this passive lateral separation is achieved by vertical steering wings that are lateral diverters, including seismic deflectors such as a Barovane, which is commercially available from Ulmatec Baro AS of Fosnavåg, Norway and underwater foils such as Smart Foil from CGG of Paris, France, associated with spread ropes. Alternatively, the desired lateral separation is achieved using the vessel width by connecting ropes to the umbilical and to vessel lateral tow points. This vessel width can be increase using booms or other type of spar displacing towing point outside the vessel width. Active separation is achieved using vertical steering wings that are steerable devices such as Nautilus, an underwater winch or an active deflector.

Overall, a plurality, for example 6 or 8, shallow towed lines or sub-arrays and a plurality, for example 4 or 8, deep towed sub-arrays are provided in the seismic source array. In one embodiment, multiple sub-arrays at three or more depths below the subsurface can be used. Positioning of the various sub-arrays or strings is achieved using, for example, lasers, GPS, RGPS and radar deflectors. Underwater positioning is achieved by devices such as acoustic devices, cameras, USBL, acoustic networks and sonar. All positioning devices could be in communication with each other to communicate positioning data.

The seismic source modules, strings and arrays are compact and easy to handle, even using complex, quite sensitive active sources. In addition, these modules, strings and arrays are hydrodynamic, reducing drag and overall increasing source stability, highly modular, deployable from slipway vessel without major modifications, reliably maintain source geometry, reduce dependence on surface conditions and work with a both impulse and vibrational seismic sources.

Figure 3:
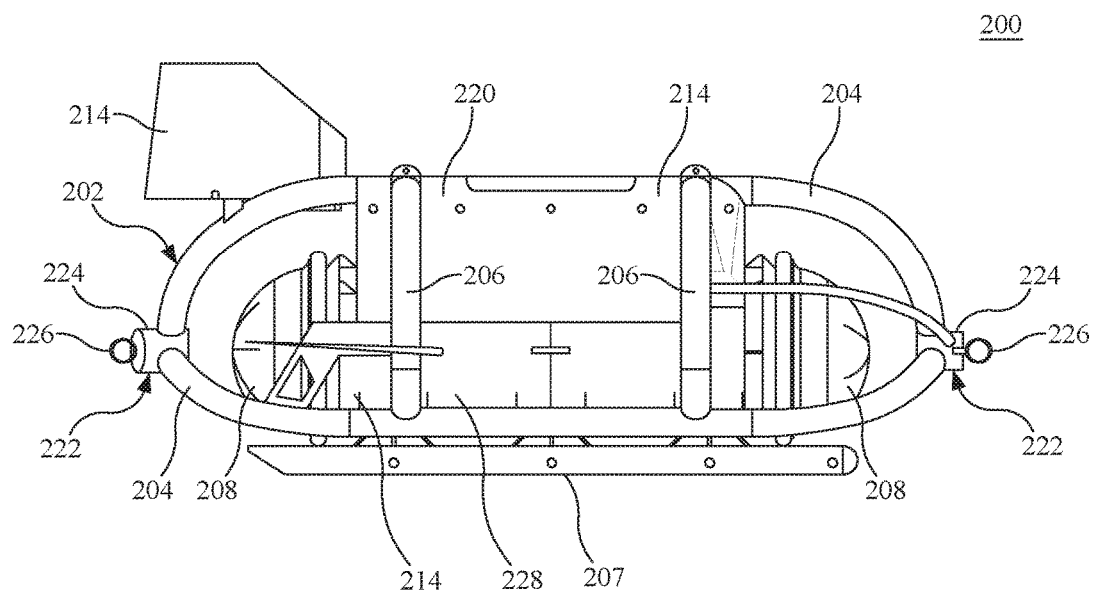
FIG. 3 is a representation of side view of an embodiment of a seismic source module.
Figure 4:
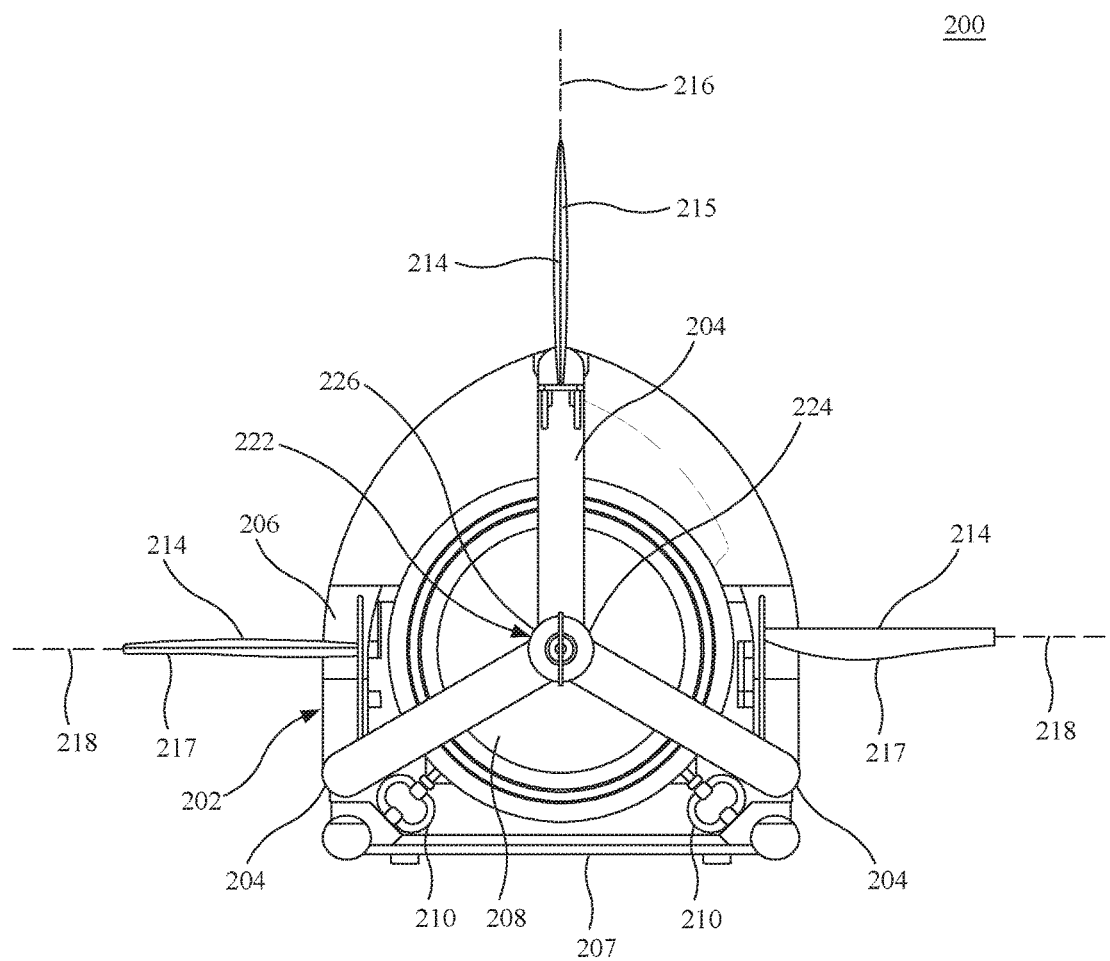
FIG. 4 is a representation of a front view of an embodiment of the seismic source module.

Referring now to FIGS. 3 and 4, in one embodiment each deep towed seismic source module 200 includes a protective cage 202. The protective cage supports and protects the various components of the seismic source module against external contacts such as debris during storage, transport, deployment and use in a marine based seismic. The protective cage is arranged to provide this support while not inhibiting the operating of the components and seismic sources contained within the protective cage. In one embodiment, the protective cage has a generally elongated shape and includes a plurality of longitudinal members 204 extending along the length of the elongated shaped and a plurality of banding members extending around the protective cage between the longitudinal members. Suitable materials for the protective cage include metals, plastics and composite materials such as carbon fiber. In one embodiment, the protective cage forms a generally open structure to permit passage of water through the protective cage to couple with the internal components of the seismic source module.

In one embodiment, the protective cage includes a flat bottom skid 207. This flat bottom skid facilitates storage and deployment from ship decks and other flat surfaces. In one embodiment, the protective cage can also include active or passive shock absorbing structures integrated into protective cage. In one embodiment, the protective cage includes additional protections for the internal components including an anodic cation exchange membrane (CEM) or protections from biological fouling.

At least one seismic source 208 is disposed within the protective cage and is decoupled from the protective cage. As used herein, decoupling refers to mechanical, vibrational or acoustical isolation between two members. Therefore, vibrations, impulses and acoustic waves are not transferred between the protective cage and the seismic source. Suitable seismic sources include, but are not limited to, impulsive acoustic sources and vibrational acoustic sources, for example, an air gun, a water gun, an explosive, a steam gun, an electromagnetic source, a mechanical displacement-type source known as a flexi choc and a marine vibrator. In one embodiment, the seismic source module includes two separate seismic sources that are both disposed in and decoupled from the protective cage. These can be the same type of seismic source or a different type of seismic source. In one embodiment, the protective cage has a generally elongated shape and the two seismic sources are disposed adjacent opposite ends of the elongated shape.

The seismic source module includes at least one mechanical isolation mount 210 disposed between each seismic source and the protective cage. These mechanical isolation mounts provide the desired decoupling between each seismic source and the protective cage. Suitable isolation mounts are known and available in the art and include passive isolation mounts that include, for example, elastomeric materials. The isolation mounts also include active isolation mounts such as active shock absorbers that apply countering and cancelling forces to any forces propagating between the seismic sources and the protective cage.

In order to control the location and depth, the seismic source module includes a steering system 214 that includes at least one or more fins extending out from the protective cage and a buoyancy mechanism disposed within the protective cage. In general, the steering system is in communication with the protective cage and is configured to move or to control movement of the seismic source module in three dimensions. Suitable fins include passive, fixed fins and active foils. In one embodiment, the fins include a plurality of fins with one fin 215 extending out from the protective cage along a first axis 216 and two additional fins 217 extending out from the protective cage along a second axis 218, perpendicular to the first axis. The buoyancy mechanism 220 is disposed within the protective cage and includes a buoyancy tank, flooding mechanism, ballast or weights and a compressed air. The buoyancy mechanism is used to control vertical movement of the seismic source model through the water column through the selective use of positive or negative buoyancy. In one embodiment, the buoyancy mechanism establishes neutral buoyancy in the seismic source module. The steering mechanism can be controlled through autonomous, on-board controllers or remotely, for example, from a towing vessel.

In one embodiment, the seismic source module includes at least one coupler 222 in communication with the protective cage. The coupler provides for deployment, towing and retrieval of the seismic source module. In addition, the coupler provides for coupling of the seismic source module to other seismic source modules. In one embodiment, the seismic source module has a generally elongated shape and includes two couplers, one on either end of the elongated shape. Each coupler includes an attachment mechanism 226. Suitable attachment mechanisms include hooks or closed loops. The attachment mechanism can also be a grasping mechanism such as a clamp. The coupler also includes at least one of a rotational dampening mechanism and a tensional dampening mechanism 224 disposed between the attachment mechanism and the protective cage. Therefore, rotational and tensional forces from tethers, ropes or cables are not translated into the seismic source module.

The seismic source module can also include additional elements 208 disposed within the protective cage. These additional elements include at least one of seismic sensors, control electronics, communication devices, gyroscopes and valves. The additional elements are disposed within the protective cage and decoupled from the protective cage and the seismic sources. Therefore, any equipment that needs to be isolated from the vibration or shock of the seismic sources while being protecting from the ambient environment by the protective cage can be included in the additional elements.

The seismic source module is configured to interface with the launch and recovery system as well as the towing system of the towing vessel. The active elements, i.e., the seismic sources are decoupled to protect the active elements and any other control elements from shocks and vibrations transmitted by the protective cage. In addition, the protective cage does not transmit the shocks and vibrations through towing cables and tethers. The seismic source module supports deployment and recovery including through the use of a streamer retrieval device (SRD).

Figure 5:
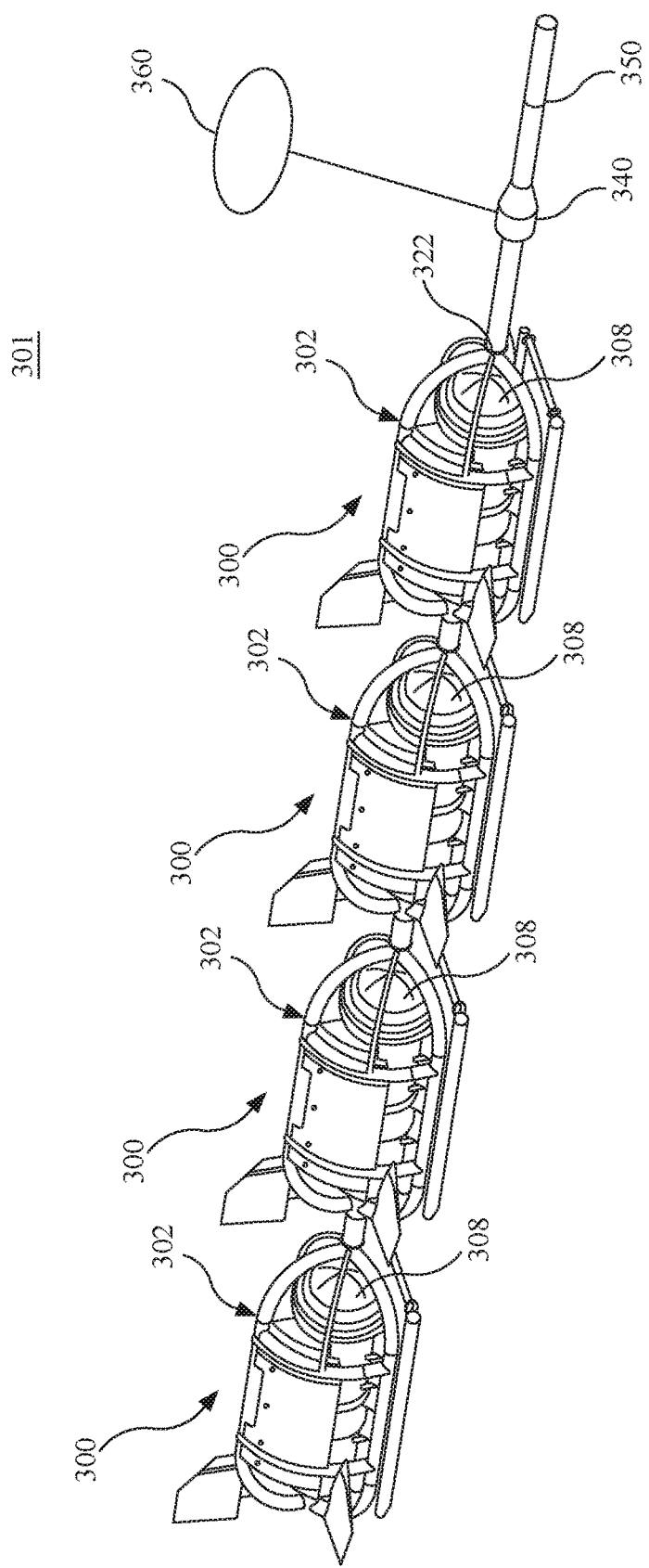
FIG. 5 is a perspective view of an embodiment of a deep towed seismic source string containing a plurality of seismic source modules.
Figure 6:
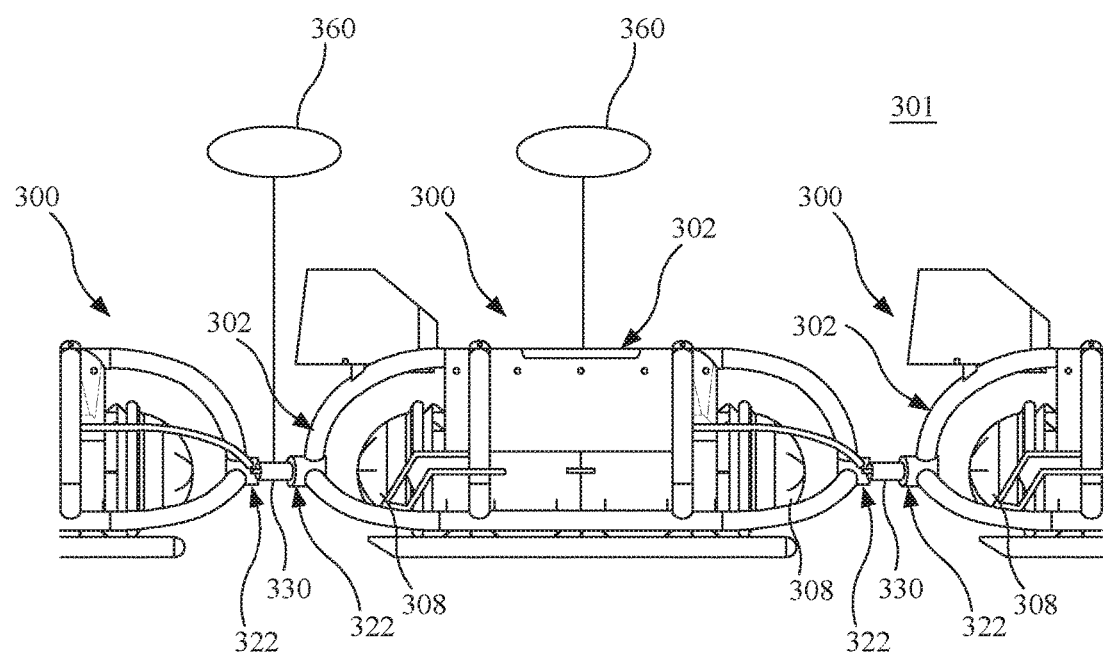
FIG. 6 is a side view of a portion of another embodiment of a deep towed seismic source string containing a plurality of seismic source modules.

Referring to FIGS. 5 and 6, one embodiment is directed to a deep towed seismic source string 301 containing at least two and preferably four seismic source modules 300 as described herein. In general, the seismic source string includes a plurality of seismic source modules coupled together in series along the seismic source string. Each seismic source module in the string includes the protective cage 302, at least one seismic source 308 disposed within the protective cage and decoupled from the protective cage and at least one coupler 322 in communication with the protective cage. Preferably, each seismic source module includes two couplers, one on either end of the protective cage to facilitate the seismic source modules being connected in series to form a string and being towed by a source vessel.

A tether 330 is attached to the at least one coupler of each seismic source module. Suitable tethers include rigid, fixed length tethers and tethers having an adjustable length. As described above, each coupler includes an attachment mechanism and at least one of a rotational dampening mechanism and a tensional dampening mechanism disposed between the attachment mechanism and the protective cage. The tethers are attached to the attachment mechanism of each seismic source module. Therefore, the tensional and rotational forces in the tethers are not translated to the seismic source modules, and these tensional and rotational forces are not translated among the seismic source modules. Alternatively, the tethers are connected to the individual seismic source modules without any mechanical or acoustic dampening.

The seismic source string includes a head module 340, or bell housing, attached to one of the seismic source modules in the string, i.e., the first or lead seismic source module, using the coupler. An umbilical 350 is attached to and extends from the head module for attachment to a towing vessel or headend towing structure. This umbilical sinks below the surface of the water due to the weight of the umbilical, the distributed weight along the entire seismic source string, the negative buoyancy of the head module, additional weight added along the length of the seismic source string or a hydrodynamic depressor.

In one embodiment, the head module embeds all or part of the command and control, energy supply, sensors, and communications from the towing vessel. The head module distributes energy and data to the individual seismic source modules and retrieves feedback data from the individual seismic source modules. In one embodiment, the head module provides the main mechanical interface between umbilical and individual seismic source modules. The head module can be a unitary structure or can be constructed from a plurality of substructures.

The distance between the individual seismic source modules in the seismic source string can be constant or can vary between different adjacent pairs of seismic source modules. In addition, all of the seismic source modules can be maintained at a common depth below the water surface, or this depth can vary among the individual seismic source modules. The individual seismic source modules can be in communication with the head module, the towing vessel and each other through wired or wireless communications.

In addition, to the buoyancy system contained within each seismic source module as described above, the seismic source string can also include one or more additional buoys 360 attached to at least one of the head module, the tethers and at least one of the two seismic source modules. Suitable buoys for seismic source strings are known and available in the art. In addition to buoys, stabilization devices such as sea floor anchors can also be included. Embodiments can include a single buoy or a plurality of buoys at various locations along the length of the seismic source string. In one embodiment, the buoys are arranged to be less sensitive to wave or water surface movement. Suitable buoys for this embodiment include any conventional buoy known and available in the art. The lengths of the ropes or cables attached to the buoys can be the same, varied, fixed or adjustable. In addition, these cables and buoys can include a dampening system, and the individual buoys can be located on the surface of the water or below the surface of the water, i.e., submerged buoy.

Steering systems including passive steering systems such as spreaders and active steering systems such can be included in communication with at least one of the head module, umbilical, the tether and one or more of the seismic source modules. In addition, these steering systems can be towed behind or following the seismic source string. Suitable steering systems and the use and attachment in seismic source strings are known and available in the art. Suitable steering systems include two-dimensional and three-dimensional steering devices such as foils, winches, propulsion mechanism, ballast and a Nautilus.

In one embodiment, a gyroscopic stabilization device can be located in the seismic source string, for example in the additional elements located with each seismic source module. Suitable gyroscopic stabilization devices are known and available in the art and provide information regarding the orientation of the seismic source string and the individual seismic source modules in three dimensions. The gyroscopic mechanism can be used in combination with steering elements to guide the steering of the seismic source string. The seismic source string can also include active towing rope connected to the umbilical for depth control, a positing device, underwater or aerial and support for a snorkel.

Figure 7:
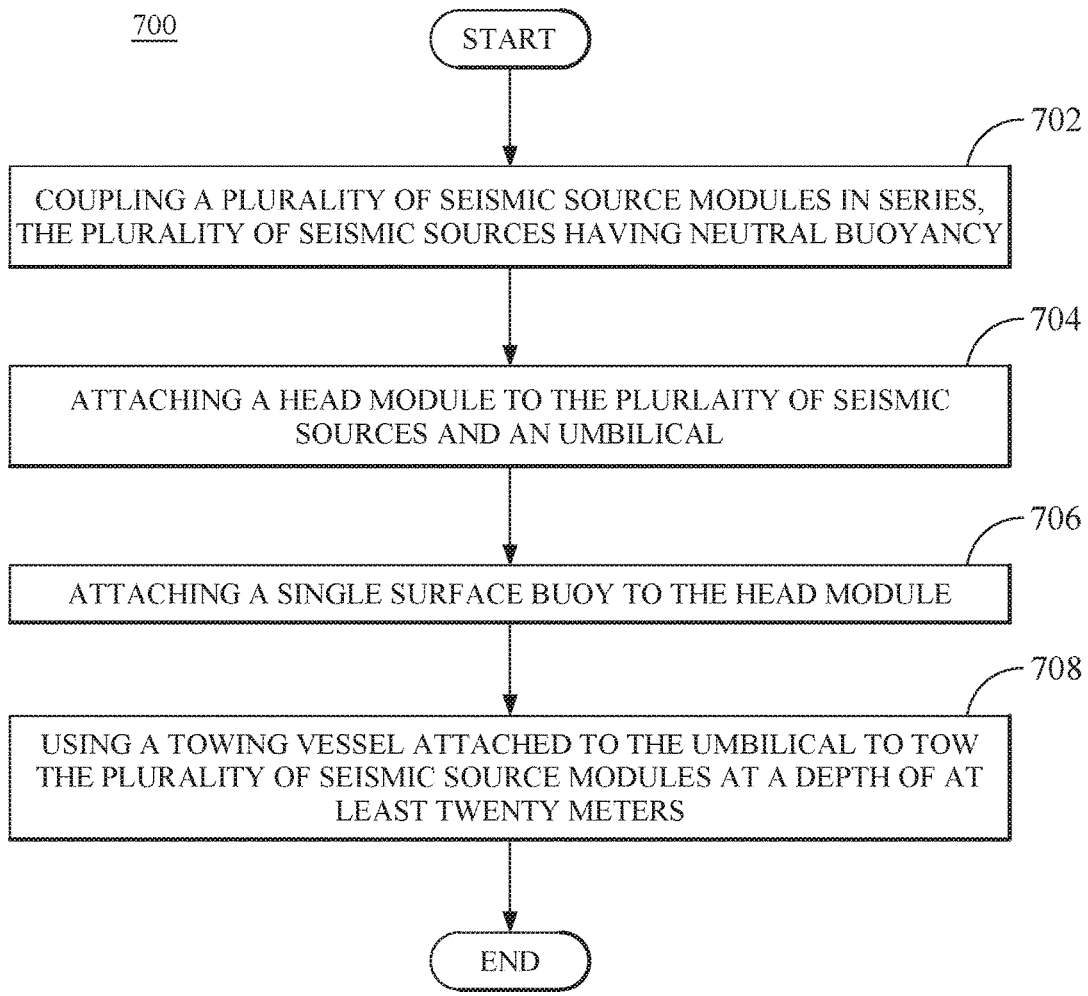
FIG. 7 is a flow chart of an embodiment of a method for towing a deep towed seismic source string.

Embodiments are also directed to methods for deep towing, i.e., towing at depths of at least about 20 meters below the surface of the water, any of the embodiments of the deep towed seismic source modules, strings and arrays as disclosed herein. Referring to FIG. 7, and embodiment of a method for deep towing a seismic source string 700 is illustrated. At least one and preferably a plurality of seismic source modules are coupled in series 702. The plurality of seismic source modules has neutral buoyancy, either collectively or individually.

A head module is attached to the plurality of seismic source modules and to an umbilical 704. Therefore, the head module is attached between the umbilical and the seismic source modules. A single surface buoy is attached to the head module 706. Preferably this is the only surface buoy attached to the umbilical, head module and plurality of seismic source modules. A towing vessel attached to the umbilical is used to tow the plurality of seismic source modules at a depth of at least 20 meters 708. In one embodiment, a buoyancy system disposed within each seismic source module is used to establish positive buoyancy, negative buoyancy or neutral buoyancy in each seismic source module.

Although the features and elements of the present exemplary embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software, or firmware tangibly embodied in a computer-readable storage medium for execution by a geophysics dedicated computer or a processor.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A deep towed seismic source string comprising:
    an umbilical for attachment to a towing vessel;
    a head module attached to the umbilical and having attached a depressor mechanism providing a downward force on the head module;
    a plurality of seismic source modules coupled in series and attached to the head module, the plurality of seismic source modules having neutral buoyancy; and
    a single surface buoy attached to the head module,
    wherein the depressor mechanism and the single buoy work together to establish and maintain a desired depth of the seismic source modules.

2. The deep towed seismic source string of claim 1, further comprising a cable attached to the surface buoy and head module, the cable comprising a length sufficient to establish a depth of at least 20 meters for the plurality of seismic source modules.

3. The deep towed seismic source string of claim 1, wherein the plurality of seismic source modules comprises four seismic source modules.

4. The deep towed seismic source string of claim 1, wherein each individual seismic source module in the plurality of seismic source modules has neutral buoyancy.

5. The deep towed seismic source string of claim 1, further comprising a vertical steering wing attached to the umbilical.

6. The deep towed seismic source string of claim 1, wherein each individual seismic source module comprises:
    a protective cage; and
    at least one seismic source disposed within the protective cage and decoupled from the protective cage.

7. The deep towed seismic source string of claim 6, wherein each seismic source module further comprises at least one mechanical isolation mount disposed between the at least one seismic source and the protective cage to decouple the at least one seismic source from the protective cage.

8. The deep towed seismic source string of claim 6, wherein each seismic source module further comprises a steering system in communication with the protective cage and configured to move the seismic source module in three dimensions.

9. The deep towed seismic source string of claim 8, wherein the steering system comprises at least one fin extending outward from the protective cage.

10. The deep towed seismic source string of claim 9, wherein the at least one fin comprises an active foil.

11. The deep towed seismic source string of claim 8, wherein the steering system comprises a plurality of fins extending outward from the protective cage along at least two perpendicular axes.

12. The deep towed seismic source string of claim 8, wherein the steering system comprises a buoyancy system disposed within the protective cage, the buoyancy system configured to establish positive buoyancy, negative buoyancy or neutral buoyancy in the seismic source module.

13. The deep towed seismic source string of claim 6, wherein each seismic source module further comprises at least one coupler in communication with the protective cage, the at least one coupler comprising:
- an attachment mechanism; and
- at least one of a rotational dampening mechanism and a tensional dampening mechanism disposed between the attachment mechanism and the protective cage.

14. The deep towed seismic source string of claim 6, wherein each seismic source module further comprises at least one of seismic sensors and control electronics disposed within the protective cage and decoupled from the protective cage and the at least one seismic source.

15. The deep towed seismic source string of claim 1, further comprising a plurality of tethers, each tether being attached to attachment mechanisms on couplers between adjacent pairs of seismic source modules in the series of seismic source modules.

16. A deep towed seismic source array comprising a plurality of deep towed seismic source strings arranged in parallel, each deep towed seismic source string comprising:
- an umbilical for attachment to a towing vessel;
- a head module attached to the umbilical and having attached a depressor mechanism providing a downward force on the head module;
- a plurality of seismic source modules coupled in series and attached to the head module, the plurality of seismic source modules having neutral buoyancy; and
- a single surface buoy attached to the head module,
- wherein the depressor mechanism and the single buoy work together to establish and maintain a desired depth of the deep towed seismic source string.

17. The deep towed seismic source array of claim 16, wherein each seismic source module comprises:
- a protective cage;
- at least one seismic source disposed within the protective cage and decoupled from the protective cage;
- a pair of couplers in communication with the protective cage, each coupler comprising:
  - an attachment mechanism; and
  - at least one of a rotational dampening mechanism and a tensional dampening mechanism disposed between the attachment mechanism and the protective cage;
- a plurality of tethers, each tether attached to attachment mechanisms on couplers between adjacent pairs of seismic source modules in the series of seismic source modules; and
- a steering system in communication with the protective cage and configured to move the seismic source module in three dimensions, the steering mechanism comprising a buoyancy system disposed within the protective cage, the buoyancy system configured to establish positive buoyancy, negative buoyancy or neutral buoyancy in the seismic source module.

18. A method for deep towing a seismic source string, the method comprising:
- coupling a plurality of seismic source modules in series, the plurality of seismic source modules having neutral buoyancy;
- attaching a head module to the plurality of seismic source modules and an umbilical;
- attaching a single surface buoy and a depressing mechanism to the head module, the depressor mechanism and the single buoy working together to establish and maintain a desired depth of the seismic source modules; and
- using a towing vessel attached to the umbilical to tow the plurality of seismic source modules at the desired depth of at least 20 meters.

19. The method of claim 18, further comprising using a buoyancy system disposed within each seismic source module to establish positive buoyancy, negative buoyancy or neutral buoyancy in each seismic source module.

* * * * *